United States Patent [19]

Adomeit

[11] 4,254,921
[45] Mar. 10, 1981

[54] WINDING SHAFT FOR A BELT ROLL-UP DEVICE FOR WINDING AND UNWINDING A VEHICLE SAFETY BELT

[75] Inventor: Heinz-Dieter Adomeit, Berlin, Fed. Rep. of Germany

[73] Assignee: Repa Feinstanzwerk GmbH, Alfdorf, Fed. Rep. of Germany

[21] Appl. No.: 970,569

[22] Filed: Dec. 18, 1978

[51] Int. Cl.³ .................... A62B 35/02; B65H 75/48
[52] U.S. Cl. ............................................. 242/107.4 C
[58] Field of Search .......................... 242/107–107.7, 242/74, 74.1, 74.2; 280/806; 297/478, 480

[56] References Cited

U.S. PATENT DOCUMENTS

| 3,138,405 | 6/1964 | Hanway | 242/107.4 C X |
| 3,301,503 | 1/1967 | Browning | 242/74 X |
| 3,337,155 | 8/1967 | Binding | 242/74 X |
| 3,432,115 | 3/1969 | Stoffel et al. | 242/74 X |
| 3,552,676 | 1/1971 | Weber | 242/107.4 B X |
| 3,802,641 | 4/1974 | Saito | 242/107 |

*Primary Examiner*—John M. Jillions
*Attorney, Agent, or Firm*—Herbert L. Lerner

[57] ABSTRACT

A winding shaft in a belt roll-up device which has a locking element connected to the winding shaft and a blocking element fastened to the housing. The locking element comes into engagement with the blocking element by a force in the direction of the belt pull exerted upon the winding shaft such as occurs when the belt unwinds too rapidly. The belt is also prevented from completely unwinding by fastening the end of the belt to the winding shaft and by means for exerting a force on the winding shaft for making the locking element respond and engage the blocking element when the last approximately 530° of turns of belt begin to unwind. Thus unwinding of about the last 1 ½ turns of belt is prevented. This relieves the possible load and damage to the fastening of the end of the belt and to the winding shaft and permits a more economical, efficient design.

8 Claims, 8 Drawing Figures

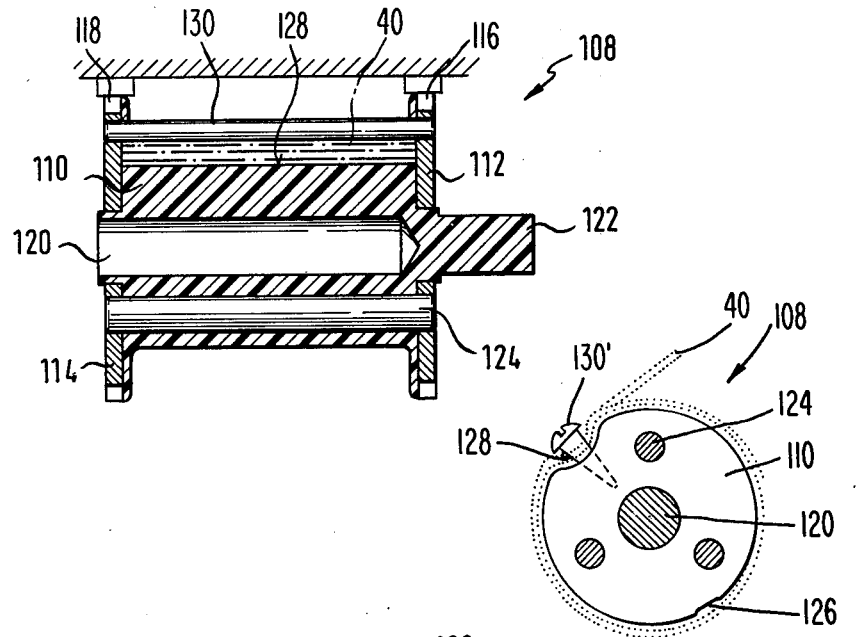
FIG. 5
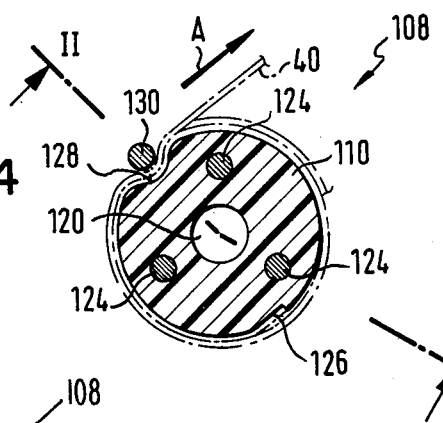
FIG. 6
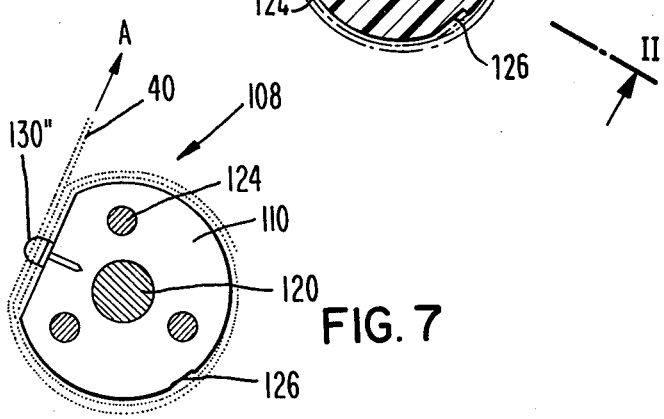
FIG. 4
FIG. 7
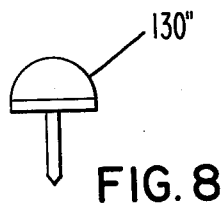
FIG. 8

WINDING SHAFT FOR A BELT ROLL-UP DEVICE FOR WINDING AND UNWINDING A VEHICLE SAFETY BELT

BACKGROUND OF THE INVENTION

1. Field of the Invention

This invention relates to a winding shaft for a belt roll-up device for winding and unwinding a vehicle safety belt, which can rotate in the belt roll-up housing for winding and unwinding the belt, where a locking element connected to the winding shaft comes into engagement with the blocking element fastened to the housing, by a force in the direction of the belt pull, exerted upon the winding shaft.

2. Description of the Invention

Belt roll-up devices of the above-mentioned type are generally known. In the various known designs, a locking element firmly connected to the winding shaft is in engagement with a monitoring device which brings the locking element into engagement with the blocking body fixed to the housing if the permissible angular acceleration of the winding shaft is exceeded, so that further unwinding of the belt is prevented so as to hold back the vehicle passenger who has fastened the safety belt. The monitoring device does not respond if the belt is unwound from the winding shaft slowly and without jerking, as usually takes place when the safety belt is applied so that the locking element and the blocking body remain out of engagement and the winding shaft can rotate freely in the belt roll-up housing.

The winding shaft, which is held centered by springs in the belt roll-up housing, rotates if the belt is unwound or rolled up slowly without jerking. The winding shaft is firmly connected to at least one locking element, which can rotate freely in a blocking body fixed relative to the housing, if it is in the centered position. If the safety belt is to be prevented from unwinding when the minimum value of the vehicle deceleration or the belt acceleration is exceeded, then the winding shaft is made to relocate itself from the centered position in the belt roll-up housing against the spring pre-tension acting on the bearing bushings of the winding shaft by a sensor if the minimum value of the vehicle deceleration is exceeded, or by the force which occurs in the belt when the minimum value of the belt acceleration in the belt strap is exceeded, so that the locking elements of the winding shaft come into engagement with the blocking bodies of the belt roll-up housing. The locking elements and the associated blocking bodies are designed so that they can take up without destruction the maximum belt load of 1500 kg required by law in the event of a blocking intervention. Also the winding shaft is designed so that it can withstand without damage the belt force of the same magnitude acting tangentially on the remaining part of the belt which is still wound up. Besides this requirement as to the strength of individual parts of a belt roll-up device, there is a further requirement with respect to the strength of the winding shaft. According to ECE R 16 (Economy Committee of Europe, Rule 16), which also applies to the Federal Republic of Germany, the winding shaft with the safety belt fastened thereto must likewise be able to stand a load of 1500 kg acting on the belt strap with the belt completely unwound, without damage being inflicted thereby on the winding shaft or the belt fastening. Even though such a condition will occur neither in normal operation nor in the event of an accident, it must nevertheless be fulfilled for the belt roll-up device to be approved generally. To meet this requirement, an elaborate and cost-intensive design of the winding shaft has heretofore been necessary. Depending on the design of the fastening of the belt to the winding shaft, bursting or wedging forces occur at the winding shaft under such a load. These loads on the winding shaft are substantially greater than those which occur tangentially in the belt pull direction with the belt partially rolled up, due to the force of likewise 1500 kg occurring at the belt. A winding shaft is known, for instance, in which there is in the direction of the diameter, a slot of the belt width, which is enlarged at one end. The end of the belt pushed through this slot is folded over and sewn to form a loop. A pin is inserted into this loop. The belt loop with the pin then rests in the enlargement, so that on the one hand, the circular surface of the winding shaft is preserved and, on the other hand, the belt end pushed through the slot cannot slide out under the tensional load. For reasons of strength and dimensional tolerances, this winding shaft is made of diecast zinc. This entails substantial material, manufacturing and assembly costs in the production as well as in the installation of the winding shaft.

SUMMARY OF THE INVENTION

It is an object of the invention to provide a winding shaft so that complete unwinding of the belt on the winding shaft is prevented with certainty.

With the foregoing and other objects in view, there is provided in accordance with the invention, a winding shaft in a belt roll-up device for winding and unwinding a vehicle safety belt, in which the winding shaft can rotate in a belt roll-up housing for winding and unwinding the belt, a locking element connected to the winding shaft, a blocking element fastened to the housing, the locking element coming into engagement with the blocking element by a force in the direction of the belt pull exerted upon the winding shaft, the improvement comprising fastening the end of the belt to the winding shaft, and means for engaging the surface of the belt at approximately 530° of turns of belt for exerting a force on the winding shaft for making the locking element respond when the last approximately 1.5 turns begin to be unwound from the winding shaft thereby engaging the blocking element and preventing the last approximately 1.5 turns of belt from unwinding.

Other features which are considered as characteristic for the invention are set forth in the appended claims.

Although the invention is illustrated and described herein as embodied in a winding shaft for a belt roll-up device for winding and unwinding a vehicle safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 shows a cross section through a further embodiment of the winding shaft, and FIG. 5 is a longitudinal section taken along the line II—II in FIG. 4.

FIG. 6 is a cross section through the winding shaft similar to FIG. 4, and is particularly directed to showing a screw 130' which is screwed into the winding shaft through two layers of belt wound on the winding shaft for exerting a force on the winding shaft.

FIG. 7 is a cross section through the winding shaft to illustrate a pin 130" pressed into the winding shaft through the two belt layers wound on the winding shaft.

FIG. 8 illustrates a pin 130".

DETAILED DESCRIPTION OF THE INVENTION

Figure 1:
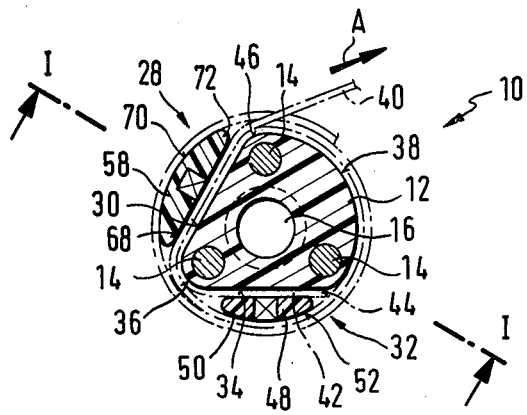
FIG. 1 shows a cross section through one embodiment of the winding shaft of the present invention.

In accordance with the invention, a device which is in engagement with the surface of the belt, exerts a force on the winding shaft to make the locking device respond when the belt begins to unwind the last approximately 530° of turns around the winding shaft.

With the invention, advantageously the condition is never reached where the belt is completely unwound from the winding shaft. When the last approximately 1.5 turns of the belt begin to be unwound from the winding shaft, the device which is in engagement with the surface of the belt exerts on the winding shaft a force which causes the monitoring device to bring the locking element into engagement with the latching body or, in the last design, to displace the winding shaft from the centered position in the belt roll-up housing for engagement of the locking element with the locking body. If the belt wants to unwind farther than provided, the device exerts a jolt on the winding shaft, which has the same effect as excessive angular acceleration by which the normal response of the latching device is initiated, as for instance, when the vehicle is involved in an accident. Thus, the belt fastening device at the winding shaft is never subjected to the direct belt force, but the maximally occurring belt forces attack the winding shaft at the locking device always only if the latter is in the detent position, at least about 1.5 belt turns remaining wound around the winding shaft. Thereby, the tension force acting on the winding shaft via the belt is always directed tangentially to the circular surface of the winding shaft for all load cases. The winding shaft therefore need to be designed only for the load which is exerted thereon by the belt and acts uniformly on the entire length of the shaft, as must also take place for a normal locking or latching action. The device for fastening the end of the belt to the winding shaft is therefore practically unstressed, since approximately 1.5 turns of the belt remain on the winding shaft. This means that the fastening device always remains covered by at least one belt layer and, if loaded, is pressed against the surface of the winding shaft by this belt layer. For this reason, the belt fastening device also can be designed accordingly. For instance, the end of the belt can be attached to the surface of the winding shaft only by wedging, which can save time and costs in the manufacture as well as in the assembly of the belt.

In one advantageous embodiment of the above-mentioned winding shaft, the device or means for exerting a force on the winding shaft consists of a circular-segment-shaped cross piece which, after about 530° of turns of the belt on the winding shaft is in engagement with the belt surface with its flat surface and is brought into connection with the winding shaft. The winding shaft is made flat in the area in which the cross piece is arranged, by a circular segment in such a manner that the circular shape is completed through two layers of the belt and the cross piece after the cross piece is put in place. The rest of the belt is rolled up on the completed circular slope. The winding shaft is made of plastic, in which at least three steel pins are arranged as reinforcement, with the pins uniformly distributed over the circumference. The cross piece to be attached at the winding shaft likewise consists of plastic. The winding shaft is further characterized by the feature that the cross piece is designed with projections at its ends and that depressions are arranged in the lateral surfaces facing each other of the two latching bodies connected to the ends of the winding shaft, to accept the projections of the cross piece. Advantageously, the winding shaft is designed so that the surface of the winding shaft has profiled teeth directed against the pull direction of the belt, and that the surface of the cross piece is smooth. In another embodiment of the winding shaft, a further, i.e. second circle segment with a flat surface is provided at the winding shaft at an angle of about 60° to the chord of the circle segment accepting the cross piece opposite the direction of the belt pull. The end of the belt is wedged fast at this second flat surface by a fastening second cross piece having the shape of a circle segment. The flat surface of the circle segment and all surfaces of the fastening second cross piece are provided with profiled teeth directed against the direction of the belt pull. The fastening cross piece is connected to the winding shaft by projections engaging with depressions in the opposite lateral surfaces of the two locking elements. The outside diameter of the fastening second cross piece corresponds to the outside diameter of the winding shaft.

In another advantageous embodiment of the winding shaft according to the invention the device or means for exerting a force on the winding shaft consists of a steel pin. The winding shaft is provided over its entire length with a depression, the depth of which corresponds to the diameter of the steel pin plus two thicknesses of the belt. The steel pin, the ends of which are arranged in the side plates of the latching bodies or locking elements connected to the winding shaft, is connected to the winding shaft after about 530° of turns of the end of the belt. The winding shaft is advantageously designed with a centered blind hole. In the winding shaft, a radial belt slot is arranged which extends into the blind hole and corresponds to the width of the belt. The belt slot has a distance of about 240° on the circumference of the winding shaft from the center of the cross piece in the direction of the belt pull. The width of the slot corresponds to the thickness of two belt layers. The belt is arranged in the belt slot and the blind hole in such manner that the end of the belt is flush with the surface of the winding shaft and the belt has two layers in the slot and forms a loop in the blind hole. A steel pin is arranged in the belt loop in the blind hole. In a further embodiment of the winding shaft, the end of the cross piece pointing in the direction of the belt pull is made with a flat projection which is bent in the winding direction and extends between the two belt layers running under the cross piece and over the cross piece.

In another embodiment of the winding shaft according to the invention, the device for exerting a force on the winding shaft consists of at least one screw screwed into the winding shaft through the two belt layers wound on the winding shaft. Alternatively, the device for exerting a force on the winding shaft is at least one clamping pin pressed into the winding shaft through the two belt layers wound on the winding shaft.

In the following, embodiment examples of the invention shown in the drawing will be described.

Figure 2:
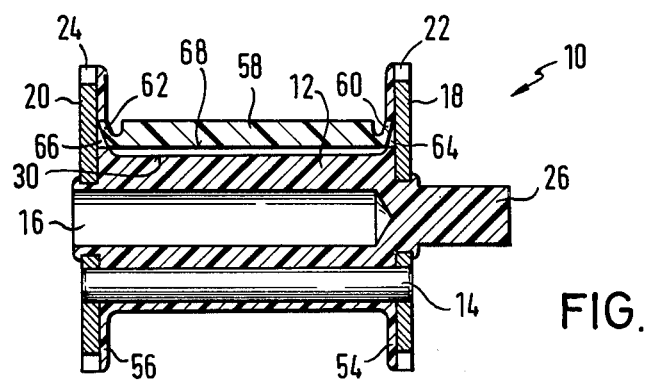
FIG. 2 is a longitudinal section taken along line I—I in FIG. 1.

The winding shaft shown in FIGS. 1 and 2 is generally designated by the numeral 10. It consists of a spool-shaped plastic member 12. To increase the strength of the winding shaft 10, three steel pins 14, uniformly distributed over the circumference, are inserted into this plastic member 12. A blind hole 16 is provided centered in the spool-shaped plastic member 12. Latching bodies or locking elements 18 and 20 are attached and rigidly connected to the plastic member 12 at the two end faces of the plastic member 12. Steel pins 14 extend through these latching bodies 18 and 20 to increase the strength of winding shaft 10. The latching bodies 18 and 20 are designed with latching teeth 22, 24 on their circumference. The spool-shaped plastic member 12 has at one end face a shaft extension 26 which serves as the axis of rotation. The blind hole 16 is intended to receive an axial pin, the free end of which serves as the second axle journal. The axle journals are supported in bearing bushings, not shown.

Referring to FIG. 1, the plastic member 12, which has circular cross section, is flattened at 28, shown by an arrow, by cutting out a circle segment over its entire length. This produces a flat surface 30 as part of the circumference of the plastic member 12. At an angle of about 60° against the direction A of the belt pull, the plastic member 12 is likewise flattened at 32 by a circle segment over its entire length. This produces a flat surface 34. The connection 36 between the two flat surfaces 30 and 34, which are arranged at an angle of about 60° is rounded with the normal radius of the spindle-shaped plastic member 12. The entire surface of the plastic member 12 is provided over the entire length on its remaining circular circumference 38 as well as on the two flat surfaces 30 and 34 and on the connecting surface 36 with profiled teeth, the direction of which is against the direction A of the belt pull.

The belt 40 is in connection with the surface 34 of the plastic member 12 via its end section 42. The belt end 44 is flush with the corner connecting the flat surface 34 and the circular surface 38. The surface, facing the flat surface 34, of the end section 42 of the belt can be provided with adhesive so that a firm connection is provided in this manner between the flat surface 34 of the plastic member 12 and the end section 42 of the belt. The belt is then wound around the joint 36, so that it subsequently rests on the flat surface 30 of the plastic member 12. From the flat surface 30, the belt 40 then makes the transition to the circular surface 38 of the plastic member 12 via the connecting corner 46. After the end section 42 of the belt is cemented to the flat surface 34, a fastening cross piece 48 is placed on the other belt surface. The fastening cross piece 48 has the cross section of a circle segment, so that it has a flat surface 50 and a circular circumference surface 52. The diameter of the circumferential surface 52 corresponds to the diameter of the circumferential surface 38 of the plastic member 12. The width of the fastening cross piece 48 corresponds to the width of the circle segment at this point less one belt thickness. After the fastening cross piece 48 is attached to the winding shaft, the surface 52 thus constitutes a continuation of the circular surface 38. As the end of belt 44 terminates with the end of the circular circumference surface 38, the belt 40 wound on the circular circumference surface 38 makes a transition to the surface 52 of the fastening cross piece 48 without forming a bend. The fastening cross piece 48 is fastened to the plastic member 12 by projections, not shown, at its two end faces which engage with depressions in the opposite lateral surfaces 54 and 56 of the latching bodies 18 and 20, respectively. The fastening cross piece 48 including its projections (not shown) is made of plastic material which has an elasticity such that the fastening cross piece can be bent to the extent that the projections can snap into the aforementioned depressions. When the fastening cross piece 48 is attached to the winding shaft 10 after the end section 42 of the belt has been cemented to the flat surface 34 of the plastic member 12, an adhesive can also be brushed on the surface 50 of the fastening cross piece 48, so that the fastening cross piece 48 makes a cemented joint with the opposite surface of the belt. It has been found that the use of adhesive between the belt and the plastic member as well as between the belt and the fastening cross piece can be dispensed with. If about 1.5 to 2 turns remain on the winding shaft, clamping the belt against the plastic member by the fastening cross piece is sufficient to prevent the belt from sliding through under load. The above-mentioned profiled teeth increase the adhesion.

The belt 40, coming from the surface 52, comes to lie on the first layer of the belt at the connecting point 36 if wound further on the winding shaft 10. From then on, the belt 40 is laid on the first layer of the belt, which lies on the flat surface 30 of the plastic member 12, if the belt is wound further in the direction of the belt pull.

After two layers of the belt 40 have been placed on the flat surface 30 of the plastic member 12, a circle-segment-shaped cross piece 58 is fastened to the winding shaft 10. This cross piece 58 is fastened to the winding shaft 10 by projections 60 and 62 arranged at its end faces. These projections 60 and 62 engage in depressions 64 and 66 in the lateral surfaces 54 and 56, respectively, of the latching bodies 18 and 20. The cross piece 58 likewise consists of plastic material which is so elastic that the cross piece can be bent sufficiently for the projections 60 and 62 to engage in depressions 64 and 66 associated therewith without damage to the cross piece 58. After the cross piece 58 is fastened, its flat surface 68 is in engagement with the belt surface facing it. The circular surface 70 of the cross piece 58 has a diameter which corresponds to the diameter of the circular circumference surface 38 plus the thickness of one belt layer. Upon further winding, the belt 40 then comes to lie over the first layer of the belt 40 arranged on the surface 38. Then, the belt 40 comes into engagement with the first layer arranged on the fastening cross piece 48. From the connecting point 36 on, the belt 40, upon further winding, comes to lie on the surface 70 of the cross piece 58. Upon further winding from the connecting corner 46 on, the belt 40 is laid from the surface 70 of the cross piece 58 over the underlying layers of the belt. Due to the above-mentioned choice of the diameters of the circular circumference surfaces, the entire belt is wound smoothly and unimpeded on the winding shaft 10.

In unwinding the belt from the winding shaft 10, a point is reached at which the next-to-the-last layer of the belt 40 begins to get lifted from the underlying layer at the connecting corner 46. At this time, the belt 40 is still wound on the plastic member 12 and the fastening cross piece 48 over about 530° of turns. When the belt 40 is unwound further, its surface is laid against the projection 72 of the fastening cross piece 48 which is in front in the direction of the arrow A. Due to the belt guide, not shown, the belt 40, upon further unwinding, moves in a straight line in the direction A of the belt pull. As the cross piece 58 and in particular, its front projection 72 no longer allow further normal unwinding of the belt from the winding shaft 10, normal rotation of the winding shaft 10 for unwinding the belt is no longer possible. Rather, reaction forces now arise in the winding shaft when the belt 40 is laid against the cross piece projection 72. These reaction forces correspond to the same forces which occur if the angular acceleration of the winding shaft is excessive, so that the latching device blocks further rotation of the winding shaft and thereby, unwinding of the belt due to the responding of the monitoring device. These reaction forces, for instance, overcome the spring pretension, to which the bearing bushings of the winding shaft are subjected in the embodiment described last. This displaces this winding shaft from the centered position in the belt roll-up housing so that the latching bodies 18 and 20 with their locking teeth 22 and 24 come into engagement with the blocking elements in the belt roll-up housing, which are fixed in the housing but are not shown. This position of the winding shaft with the latching bodies engaged with the blocking elements is the normal blocking position for excessive belt forces or if a minimum value of the vehicle deceleration is exceeded. In this blocked position, the individual parts such as the winding shaft, the latching bodies, the latching teeth and the blocking elements fixed in the housing can withstand the maximum load exerted by the belt without breaking and destruction. If a large belt force occurs when the belt is unwound up to engagement of the next-to-the-last belt turn with the projection 72 of the fastening cross piece, the above-mentioned profiled teeth on the surfaces of the plastic member aid the frictional connection between the belt and the plastic member. Also the choice of the angle of about 60° between the two flat surfaces 30 and 34 serves to prevent the last one-and-one-half turns of the belt from sliding on the plastic member. The last belt layer lying on the fastening cross piece 48 presses the fastening cross piece firmly against the underlying belt section if heavy loads occur in the belt, so that the end section of the belt is prevented from sliding off the surface 34. The material of the plastic member 12 and the dimensions of the three steel pins 14 are chosen so that the maximally occurring forces can be taken up by the winding shaft without difficulty and without the danger of damage, when the latching body or locking element engages the blocking elements.

In a modification, not shown, of the above-mentioned embodiment, the projection 72 of the cross-piece 58 is extended in the direction of the rolled-up belt, so that this projection is arranged between the uppermost turn which runs under the cross piece 58, and the next turn placed over the surface 70 of the cross piece. A projection 72 extended in this manner causes the afore-mentioned reaction forces to occur a few degrees of angle sooner, namely, if the surface of the belt comes into engagement with the projection 72 when the next-to-the-last turn is being unwound. The material of the cross piece 58 and the projection 72 integrally connected thereto is chosen so in this embodiment (not shown), this projection can bend elastically when the last turn of the belt is unwound, without danger of this projection breaking off. The elastic bending of the projection when the belt is unwound at the beginning of the last approximately 1.5 turns sets up a radial shifting of the winding shaft which ensures the response of the latching bodies with their latching teeth for a reliable engagement of the blocking device.

Figure 3:
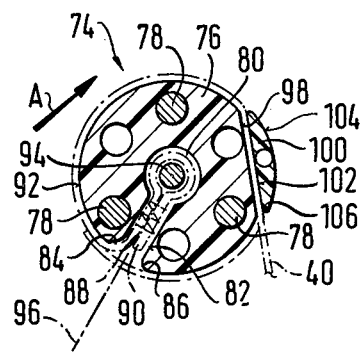
FIG. 3 shows a cross section through another embodiment of the winding shaft.

In FIG. 3, another embodiment of the winding shaft designated generally by numeral 74, is shown. The winding shaft 74 consists of a spool-like plastic member 76 of circular cross section. Steel pins 78 are arranged in this plastic member 76 and uniformly distributed over the circumference, to increase the strength. The winding shaft 74 is provided at its end faces with latching bodies (not shown), which have locking teeth at their circumference. A blind hole 80 is centered in the winding shaft 74. A slot 82 extends in the radial direction from the blind hole 80 over the length of the winding shaft corresponding to the width of the belt. The width of the slot 82 corresponds to twice the belt thickness. The corners 84 and 86 terminating the slot 82 at the surface of the winding shaft are rounded so that damage to the belt is impossible. An end section 88 of the belt 40 is arranged in the slot 82 as well as in the blind hole 80. The belt is placed in the slot and the blind hole so that the end 90 of the belt is flush with the edge 86 of the slot 82. The belt then lies along the surface of the slot and the surface of the blind hole and extends over the edge 84 around the circular surface 92 of the winding shaft 74 in the direction A of the belt pull. In the interior of the blind hole 80 left open by the belt 40, a steel pin 94 is inserted which prevents the end section of the belt 88 from sliding out of the blind hole 80 and the slot 82 in the event of a tensional load.

At a distance of about 240° of a turn in the belt pull direction A from the center line 96 of the slot 82, a circle segment is cut from the winding shaft 74 over its entire length, so that a flat surface 98 is produced. After the belt 40 is wrapped around the circular circumference surface 92 of the winding shaft 74 and the belt is placed on the flat surface 98, a cross piece 100 is arranged in the proximity of the surface 98 and is fastened to the winding shaft 74 in a manner not shown. The cross piece 100 has the shape of a circle segment, so that its flat surface 102 rests on the surface arranged underneath the belt 40 placed on the flat surface 98. The circular surface 104 has a diameter which corresponds to the diameter of the circular circumference surface 92. The thickness of the cross piece 100 corresponds to the circle segment cut from the winding shaft 74 minus the thickness of one belt layer. It follows that, after the cross piece 100 is fastened on a layer of the belt, the surface 104 is a continuation of the circular circumference layer 92 of the winding shaft 74. After the cross piece 100 is attached, the belt is rolled up completely on the winding shaft 74 in the customary manner. Upon unwinding the belt 40 from the winding shaft 74, the surface of the belt comes into engagement with the projection 106, in front in the belt pull direction A, of the cross piece 100 if the last layer of the belt 40 is to be unwound. Through this engagement of the belt with the projection 106, a force is exerted on the winding shaft 74, which corresponds to an excessive angular acceleration, whereby the blocking device is made to respond. In this manner, the belt 40 is prevented from unwinding completely, so that the end section 88 of the belt 40 is never subjected to the full force of the belt. Also, the belt force always acts on the winding shaft only tangentially.

FIGS. 4 and 5 show a further embodiment of a winding shaft for a belt roll-up device for winding and unwinding a vehicle safety belt which can rotate in a belt roll-up housing. The winding shaft shown in FIGS. 4 and 5 is generally designated by numeral 108. The winding shaft 108 has a spool-shaped plastic member 110. Latching bodies 112 and 114 are rigidly connected to the lateral sides of member 110. The latching bodies 112 and 114 have locking teeth 116 and 118 on the circumference, which can be brought into engagement with blocking elements, not shown, of the belt roll-up housing, for preventing an unwind motion of the winding shaft 108. A blind hole 120 is centered in the winding shaft 108. At the end face facing away from the blind hole 120, the winding shaft has a shaft stub 122. Three steel pins 124 are arranged in the spool-shaped plastic member 110 and uniformly distributed on the circumference of the plastic member 110 to increase its strength. A circle segment is cut from the plastic member 110 along its entire length, so that a flat surface 126 is produced. The thickness of this cut-off circle segment corresponds to the thickness of the belt 40 which is wound on the winding shaft 108. The plastic member 110 is provided with a depression 128 at 530° circumferential direction in the belt pull direction A. The surface of the plastic member 110 is provided with profiled teeth which are directed against the direction A of the belt pull. A steel pin 130, the ends of which are fastened in the latching elements 112 and 114, not shown, at the end faces of the winding shaft 108, is disposed above the depression 128 in the direction of the diameter. The steel pin 130 is arranged in the latching bodies so that its surface is a distance from the surface of the depression 128, which corresponds to twice the belt thickness of the belt 40 to be rolled up. The radius of the depression 128 is equal to the radius of the steel pin 130 plus the thickness of two belt layers. It follows that, after two belt layers are arranged on the circumference of the winding shaft 108 and in the depression 128 and after the steel pin 130 is fastened in the latching bodies, the third layer of the belt 40 can be arranged on top of the steel pin 130 without the third belt layer being noticeably deflected thereby at the location of the steel pin 130. When the wound-up belt is unwound, the surface of the latter comes to lie against the steel pin 130 if the last one and one-half turns are to be unwound. Through this engagement of the belt with the steel pin 130, a force is again produced at the winding shaft as in the case of an excessively large angular acceleration, so that thereby the locking device is made to respond. Also with this embodiment, the last 1.5 turns are reliably prevented from being unwound from the winding shaft. Thus, the fastening device at the winding shaft need not be designed for the largest possible belt force, since this belt force never appears at this fastening device.

In one embodiment, not shown, of the winding shaft, the end of the belt can also screwed fast by one or more screws which extend through the belt and into the winding shaft. After looping the belt around the winding shaft approximately 530°, one or more screws are then screwed again into the winding shaft through the two belt layers. These last-mentioned screws now exert on the winding shaft a force, if the last about 530° of turns of the belt on the winding shaft are to be unwound, which corresponds to the force which becomes effective in the winding shaft if the permissible angular acceleration is exceeded, so that thereby the blocking device is made to respond. Clamping pins can also be inserted through the belt and into the winding shaft instead of the screws.

There are claimed:

1. A winding shaft in a belt roll-up device for winding and unwinding a vehicle safety belt, in which the winding shaft can rotate in a belt roll-up housing for winding and unwinding the belt, a locking element connected to the winding shaft, a blocking element fastened to the housing, the locking element coming into engagement with the blocking element by a force in the direction of the belt pull exerted upon the winding shaft, the improvement comprising means for fastening the end of the belt to the winding shaft, and means for engaging the surface of the belt at approximately 530° of turns of belt for exerting a force on the winding shaft for making the locking element respond when the last approximately 1.5 turns begin to be unwound from the winding shaft thereby engaging the blocking element and preventing the last approximately 1.5 turns of belt from unwinding, and wherein the means for engaging the surface of the belt for exerting a force on the winding shaft comprises a circle-segment-shaped cross piece which is brought into connection with the winding shaft after about 530° of turns of the belt from the belt end around the winding shaft, with the flat surface of the cross piece in engagement with the surface of the belt, and wherein the winding shaft is flattened in the region in which the cross piece is arranged, by a segment of a circle in such a manner that the circular shape is completed by two layers of belt and the cross piece, after the cross piece is attached.

2. Winding shaft according to claim 1, wherein the end of the cross piece pointing in the pull direction of the belt has a projection which extends between the uppermost layer of the belt which runs under the cross piece and the next layer of belt which runs over the surface of the cross piece.

3. Winding shaft according to claim 1, wherein the winding shaft is made of plastic, in which at least three steel pins, uniformly distributed over the circumference, are arranged as reinforcement, and wherein the cross piece which is to be attached, likewise consists of plastic.

4. Winding shaft according to claim 3, including two locking elements connected to the ends of the winding shaft and having mutually opposed lateral surfaces, and wherein the cross piece has projections at its ends, which projections are adapted to the inserted in depressions formed in said lateral surfaces.

5. Winding shaft according to claim 4, wherein the winding shaft has a blind hole in the center; and wherein a radial belt slot which corresponds to the width of the belt and extends into the blind hole is arranged in the winding shaft; and wherein the belt slot is disposed a distance of about 240° on the circumference of the winding shaft from the center of the cross piece in the direction of the pull of the belt; and wherein the width of the slot corresponds to the thickness of two belt layers; and wherein the belt is arranged in the belt slot and the blind hole in such a manner that the end of the belt is flush with the surface of the winding shaft and the belt runs in the slot in two layers and in the blind hole, forming a loop; and wherein a steel pin is arranged in the loop of the belt in the blind hole.

6. Winding shaft according to claim 1, wherein the locking element comprises profiled teeth formed on the surface of the winding shaft and directed against the pull direction of the belt and wherein the surface of the cross piece is smooth.

7. Winding shaft according to claim 1, wherein an additional locking element is connected to the winding shaft, and wherein a second circular segment with a flat surface is provided at the winding shaft against the pull direction of the belt at an angle of about 60° to the chord of the circle segment receiving the cross piece, and wherein the end of the belt is clamped in the winding shaft at said flat surface by said second circular segment; wherein the fastening second circular segment is connected to the winding shaft by projections engaging with depressions in opposite lateral surface of the two locking elements connected to ends of the winding shaft; and wherein the outside diameter of the fastening second circular segment corresponds to the outside diameter of the winding shaft.

8. A winding shaft in a belt roll-up device for winding and unwinding a vehicle safety belt, in which the winding shaft can rotate in a belt roll-up housing for winding and unwinding the belt, a locking element connected to the winding shaft, a blocking element fastened to the housing, the locking element coming into engagement with the blocking element by a force in the direction of the belt pull exerted upon the winding shaft, the improvement comprising means for fastening the end of the belt to the winding shaft, and means for engaging the surface of the belt at approximately 530° of turns of belt for exerting a force on the winding shaft for making the locking element respond when the last approximately 1.5 turns begin to be unwound from the winding shaft thereby engaging the blocking element and preventing the last approximately 1.5 turns of belt from unwinding, including an additional locking element, each thereof being connected to respective ends of the winding shaft, and wherein the means for exerting a force on the winding shaft is a steel pin, and wherein the winding shaft has a depression along its entire length, the depth of which corresponds to the diameter of the steel pin plus two belt thicknesses; and wherein the steel pin with its ends disposed in the two locking elements, is connected to the winding shaft after about 530° of turns of the end of the belt.

* * * * *